H. E. GRIDER.
SPRING HUB.
APPLICATION FILED JULY 18, 1916.

1,264,502.

Patented Apr. 30, 1918.
2 SHEETS—SHEET 1.

WITNESSES

INVENTOR
Herbert E. Grider,
BY
ATTORNEY

H. E. GRIDER.
SPRING HUB.
APPLICATION FILED JULY 18, 1916.
1,264,502.
Patented Apr. 30, 1918.
2 SHEETS—SHEET 2.
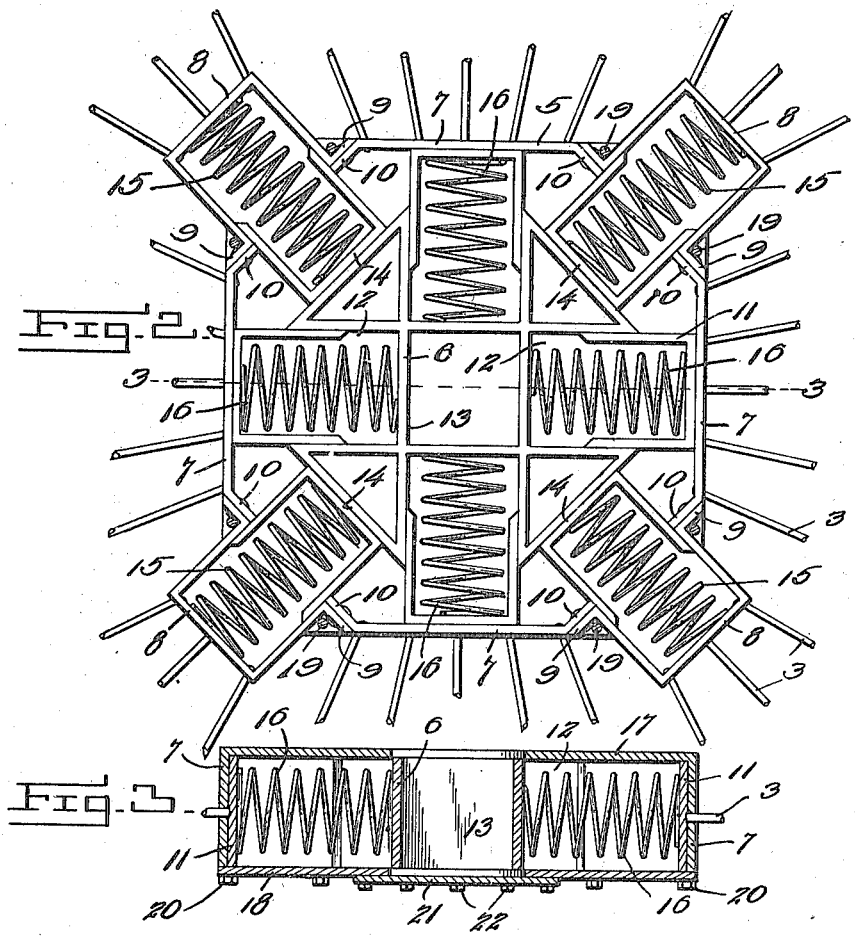
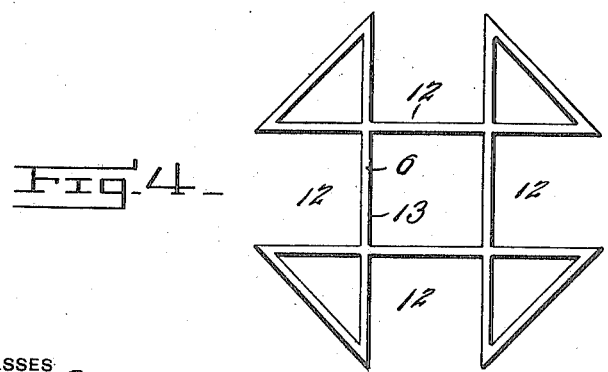
INVENTOR
Herbert E. Grider
WITNESSES
BY
ATTORNEY

UNITED STATES PATENT OFFICE.

HERBERT E. GRIDER, OF BARTON, NORTH DAKOTA.

SPRING-HUB.

1,264,502.

Specification of Letters Patent.

Patented Apr. 30, 1918.

Application filed July 18, 1916. Serial No. 109,919.

*To all whom it may concern:*

Be it known that I, HERBERT E. GRIDER, a citizen of the United States, residing at Barton, in the county of Pierce and State of North Dakota, have invented certain new and useful Improvements in Spring-Hubs, of which the following is a specification.

This invention has relation to resilient wheels, and the nature and objects thereof will be readily apparent to those skilled in the art to which it appertains, in the light of the following explanation of the accompanying drawings illustrating what I now believe to be the preferred embodiment, or mechanical expression of my invention, from among other forms and arrangements within the spirit thereof and the scope of the appended claims.

However, an object of the invention is to provide a wheel for motor vehicles or the like and having a resilient wheel center or hub whereby the intensity of shocks imparted to the wheel through inequalities of the road bed will be materially reduced, thereby obviating the necessity of pneumatic tires.

Another object of the invention is to provide a wheel having the above named characteristics and in addition thereto, means for presenting a rigid structure adapted to resist the turning torque applied to the rear wheels during the travel of a vehicle or when the same is to be started.

In addition to the foregoing, my invention comprehends improvements in the details of construction and arrangement of the parts whereby the objects are accomplished in a manner to be hereinafter described and particularly pointed out in the appended claims.

In the accompanying drawings, in which similar and corresponding parts are designated by the same characters of reference throughout the several views in which they appear;

Fig. 2, is an enlarged view of the central mechanism of the wheel of the foregoing figure with the face plate removed.

Fig. 3, is a horizontal section on the line 3—3 of Fig. 2.

Fig. 4, is a view in elevation of the inner hub section detached, and

Figure 1:
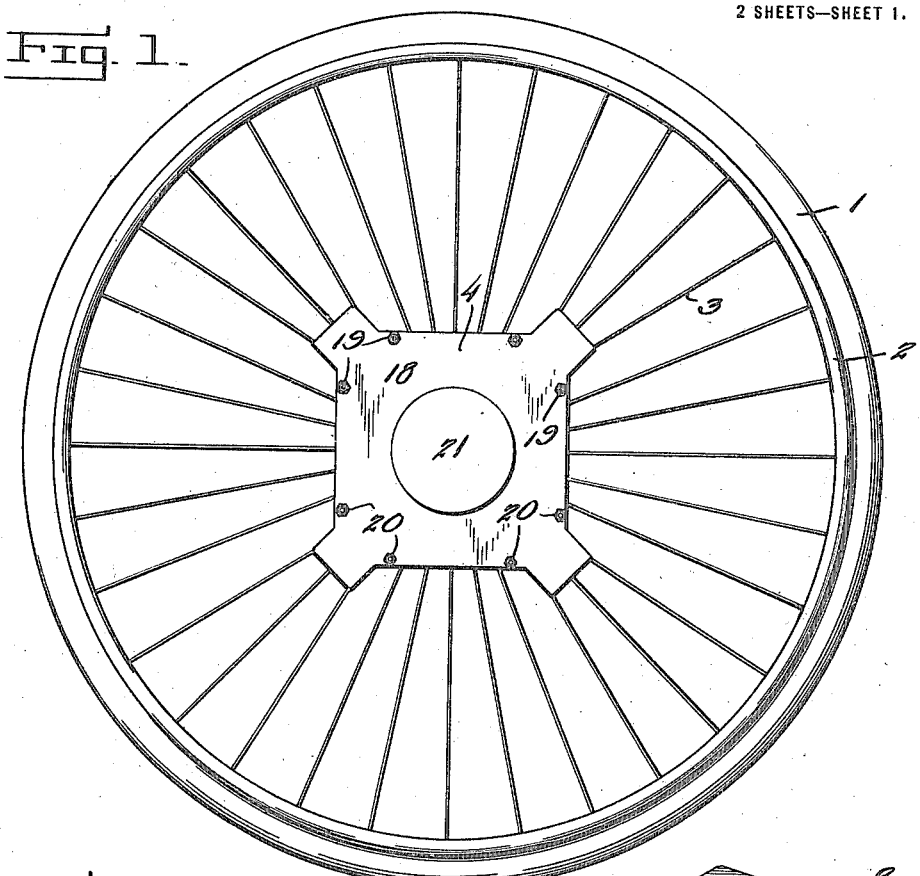
Figure 1, is a view in side elevation of a resilient wheel constructed after the manner of my invention.
Figure 5:
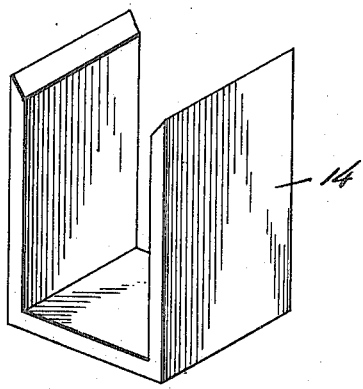
Figs. 5 and 6, are detailed views in perspective of coacting spring houses of the inner and outer hub sections respectively.
Figure 6:
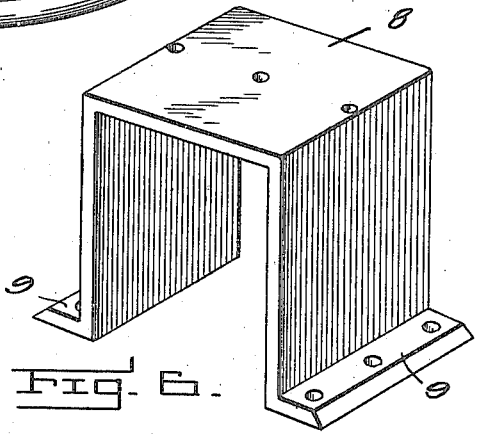

With reference to the drawings, 1 indicates the tread of my improved wheel which may be formed of solid rubber or the like held within a felly 2, and 3 indicates the spokes forming a connection between the felly and the outer member of the wheel hub indicated generally at 4.

The wheel center is composed of an outer hub section 5 and an inner hub section 6. The outer hub section is formed of plates 7 adapted to form when in proper relation, the sides of an equi-lateral rectangle, or square. The corners of the rectangle are formed by substantially U-shaped spring housings 8 formed of a metal plate bent into the above named form and having their terminals bent outwardly at right angles as at 9 for connection to the bent terminals 10 of the plates 7. In this manner diagonally opposed recesses are formed at the corners of the outer hub section.

U-shaped spring housings 11 are provided upon the inner sides of the plates 7, the same being formed of metal plates bent to form and adapted to contact at their intermediate portions with the plates 7 at points intermediate their corners so as to provide oppositely disposed recesses on the alternate inner faces of the outer hub section. The inner hub section 6 is in the form of an open work equi-lateral rectangle, the corners of which are formed with diagonal inwardly extending recesses 12. The center of the inner hub section is preferably formed square as at 13 to receive the rear axle, or in the case of the front wheels, a suitable bearing. With the inner and outer hub sections assembled in proper relation, the sides of the U-shaped members 11 slidably engage the opposite sides of the recesses 12 of the inner hub section.

U-shaped members 14 similar in form and construction to the members 11 are provided upon each side of the inner hub section and extend outwardly therefrom for engagement in the recesses formed by the members 8 of the outer hub section. Coil springs 15 and 16 are interposed respectively between the members 8 and 14 and the members 11 and the bottom portions of the recesses 12.

The plates forming the outer hub section and the inner hub section are of equal width, and the side plates of the outer hub section are formed with an integral rear face plate 17 which is formed with a central opening in registration with the opening 13 of the inner hub section. A front face plate 18 may be separably connected to the outer hub section at the opposite side thereof by means of transversely extending bolts 19 secured by nuts 20. The plate 18 is likewise provided with a central opening but which may be normally closed by means of a hub plate 21 secured to the plate 18 by means of suitable fastenings 22.

It will be apparent that in whatever position the wheel assumes during its rotation, the inner hub section will be resiliently supported, and the springs will materially reduce the intensity of shocks incidental to contact of the wheel tread with the road bed. As long as the strain is produced in a diametrical plane through the wheel, the springs will be operative to resist the strain, however, if the strain is circumferential, as for instance, when the rear axle initially imparts rotation to the rear wheels, during the starting of the vehicle or the travel thereof, such rotative strain will be positively resisted owing to the formation of the inner and outer hub sections, and the U-shaped members having sliding inter-engagement between the hub sections. The various U-shaped members are to be of resilient metal and if the strain upon the wheel exceeds the supporting ability of the springs, the said members may act to further cushion the strain by flexing.

While I have illustrated and described my invention with some degree of particularity, I realize that in practice various alterations thereover may be made, and I therefore reserve the right and privilege of changing the form of the details of construction, or otherwise altering the arrangement of the correlated elements without departing from the spirit of the invention or the scope of the appended claims.

Having thus described my invention what I claim as new and desire to secure by Letters Patent is:—

1. A resilient wheel including an octagonal outer hub section and an inner rectangular hub section, the outer hub section having alternate faces recessed outwardly, and the inner section having inwardly and diagonally extending recesses, members on the inner and outer hub sections telescopically engaged in the recesses to form with said recesses spring housings, and springs located in said housings to bear at their ends against the hub sections to resist relative diametrical movement thereof, said members limiting relative circumferential movement of the sections.

2. A resilient wheel including an octagonal outer hub section having an opening provided in each alternate face, an inner hub section rectangular in configuration and having inwardly and diagonally extending recesses, substantially U-shaped members secured to the outer hub section over the openings therein, members telescopically engaged in said U-shaped members and in contact with the inner hub section, members telescopically engaged in the recesses of the inner hub section and in contact with alternate faces of the outer hub section, and coil springs in said recesses of the inner hub section adapted to bear at their ends against the inner and outer hub sections and coil springs in the U-shaped members bearing in a similar manner against the inner and outer hub sections to resiliently resist relative diametrical movement of the hub sections, said telescopic members limiting relative circumferential movement of said hub sections.

In testimony whereof I affix my signature in presence of two witnesses.

HERBERT E. GRIDER.

Witnesses:
OTTO FERING,
F. ARNOLD JOHNSON.